(12) United States Patent
Shimokawa

(10) Patent No.: US 10,167,820 B2
(45) Date of Patent: Jan. 1, 2019

(54) FUEL TANK SYSTEM

(71) Applicant: TOYOTA JIDOSHA KABUSHIKI KAISHA, Toyota-shi, Aichi-ken (JP)

(72) Inventor: Shinji Shimokawa, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/961,436

(22) Filed: Dec. 7, 2015

(65) Prior Publication Data

US 2016/0177884 A1 Jun. 23, 2016

(30) Foreign Application Priority Data

Dec. 19, 2014 (JP) ................ 2014-257728

(51) Int. Cl.
| | |
|---|---|
| *B60K 15/03* | (2006.01) |
| *F02D 41/00* | (2006.01) |
| *F02M 25/08* | (2006.01) |
| *B60K 15/035* | (2006.01) |
| *F02M 37/10* | (2006.01) |

(52) U.S. Cl.
CPC ... *F02M 25/0836* (2013.01); *B60K 15/03504* (2013.01); *F02D 41/004* (2013.01); *F02M 25/089* (2013.01); *F02M 25/0854* (2013.01); *B60K 2015/03296* (2013.01);
(Continued)

(58) Field of Classification Search
CPC .......... F02M 25/0818; F02M 25/0872; F02M 2025/0845; F02M 25/0836; F02M 25/089; F02M 25/0854; F02M 37/10; B60K 15/03519; B60K 2015/03514;
(Continued)

(56) References Cited

U.S. PATENT DOCUMENTS 5,575,265 A * 11/1996 Kurihara ............ F02M 25/0809
123/520
6,796,295 B2 * 9/2004 Kidokoro ........... F02M 25/0836
123/520
(Continued)

FOREIGN PATENT DOCUMENTS

| JP | 2003-247461 A | 9/2003 |
|---|---|---|
| JP | 2004308493 A * | 11/2004 |

(Continued)

*Primary Examiner* — Joseph J Dallo
*Assistant Examiner* — Scott A Reinbold
(74) *Attorney, Agent, or Firm* — Oliff PLC

(57) ABSTRACT

A fuel tank system including a fuel tank internally storing fuel, a canister in which vaporized fuel generated in the fuel tank is adsorbed and desorbed by an adsorbent, and open to the atmosphere by an atmosphere communication pipe, a purging pipe placing an engine in communication with the canister, a vent pipe placing the fuel tank in communication with the canister, a negative pressure pump provided at the atmosphere communication pipe, causing negative pressure to act on the fuel tank from the canister, and a negative pressure open/close valve provided at the vent pipe, maintaining an open state at a pressure difference between a negative pump pressure acting from the negative pressure pump and a tank internal pressure acting from the fuel tank, and closing at a pressure difference between a negative purging pressure acting from the engine and the tank internal pressure.

4 Claims, 4 Drawing Sheets

(52) U.S. Cl.
CPC .............. *B60K 2015/03514* (2013.01); *B60Y 2400/306* (2013.01); *F02M 37/10* (2013.01)

(58) Field of Classification Search
CPC .... B60K 2015/03296; B60K 15/03504; F02D 41/004; B60Y 2400/306
See application file for complete search history.

(56) References Cited

U.S. PATENT DOCUMENTS

| | | | | |
|---|---|---|---|---|
| 7,290,535 | B2* | 11/2007 | Kimura | F02M 25/0818 123/518 |
| 8,528,528 | B2* | 9/2013 | Fukui | F02M 25/08 123/516 |
| 8,683,852 | B2* | 4/2014 | Makino | F02M 33/02 123/516 |
| 8,840,712 | B2* | 9/2014 | Kitamura | F02M 37/0047 123/519 |
| 8,888,901 | B2* | 11/2014 | Kimoto | B01D 53/0446 123/519 |
| 2007/0113634 | A1 | 5/2007 | Kimura | |
| 2010/0294251 | A1* | 11/2010 | Makino | F02M 25/0836 123/519 |
| 2011/0220071 | A1* | 9/2011 | Horiba | F02M 25/0836 123/520 |
| 2011/0252972 | A1* | 10/2011 | Ogawa | F02M 25/089 96/108 |
| 2011/0253110 | A1* | 10/2011 | Fukui | F02D 41/004 123/520 |
| 2012/0186333 | A1* | 7/2012 | Nishimura | F02M 25/0809 73/40.5 R |
| 2013/0008414 | A1* | 1/2013 | Matsunaga | F02M 25/0809 123/519 |
| 2013/0306628 | A1* | 11/2013 | Aso | B60K 15/03504 220/4.14 |
| 2014/0137964 | A1* | 5/2014 | Aso | F02M 25/0836 137/587 |
| 2014/0182360 | A1 | 7/2014 | Horiba | |
| 2015/0068499 | A1* | 3/2015 | Sano | 123/520 |

FOREIGN PATENT DOCUMENTS

| | | |
|---|---|---|
| JP | 2007-138889 A | 6/2007 |
| JP | 2007-211601 A | 8/2007 |
| JP | 2011-185226 A | 9/2011 |
| JP | 2011-226308 A | 11/2011 |
| JP | 2013-117181 A | 6/2013 |
| JP | 2013-144942 A | 7/2013 |
| JP | 2014-206074 A | 10/2014 |

* cited by examiner

FUEL TANK SYSTEM

CROSS-REFERENCE TO RELATED APPLICATION

This application is based on and claims priority under 35 USC 119 from Japanese Patent Application No. 2014-257728 filed on Dec. 19, 2014, the disclosure of which is incorporated by reference herein.

BACKGROUND

Technical Field

The present invention is related to a fuel tank system.

Related Art

A fuel tank system is known in which a valve member (a diaphragm valve) is provided to a vent pipe that places a fuel tank in communication with a canister (for example, see Japanese Patent Application Laid-Open (JP-A) No. 2013-144942). In this fuel tank system, during ordinary operation, the valve member is closed so as to seal the fuel tank. However, when detecting whether or not a perforation has developed in the fuel tank (referred to simply as "perforation detection" hereafter), negative pressure from a negative pressure pump is introduced into the fuel tank by causing a negative pressure to act on a back pressure chamber of the valve member so as to open the valve member. More specifically, negative pressure from a negative pressure pump is caused to act on the back pressure chamber by providing a canister side bypass route that places the vent pipe at the canister side in communication with the back pressure chamber of the valve member.

In some cases, negative pressure generated when driving the engine is caused to act on a canister in which a vaporized fuel is adsorbed onto an adsorbent, and vaporized fuel adsorbed onto the adsorbent of the canister is caused to desorb (is purged).

In such cases, when the negative pressure from the engine acts on the fuel tank through the vent pipe from the canister, it is difficult to efficiently purge the canister using the negative pressure from the engine.

SUMMARY

In consideration of the above points, the present invention concerns enabling perforations to be detected in a fuel tank system, and efficiently purging a canister.

A first aspect of the present invention includes: a fuel tank that internally stores fuel; a canister in which vaporized fuel generated in the fuel tank is adsorbed and desorbed by an adsorbent, and that is open to the atmosphere by an atmosphere communication pipe; a purging pipe that places an engine in communication with the canister; a vent pipe that places the fuel tank in communication with the canister; a negative pressure pump that is provided at the atmosphere communication pipe, and that causes negative pressure to act on the fuel tank from the canister; and a negative pressure open/close valve that is provided at the vent pipe, that maintains an open state at a pressure difference between a negative pump pressure acting from the negative pressure pump and a tank internal pressure acting from the fuel tank, and that closes at a pressure difference between a negative purging pressure acting from the engine and the tank internal pressure acting from the fuel tank.

In this fuel tank system, the fuel tank and the canister can communicate using the vent pipe. When gas including vaporized fuel generated in the fuel tank is sent to the canister through the vent pipe, the vaporized fuel component of the gas is adsorbed on the adsorbent, and the air components in atmosphere are exhausted from the atmosphere communication pipe into the atmosphere.

The negative pressure open/close valve is provided at the vent pipe. When purging the canister, negative pressure (negative purging pressure) acts on the canister from the engine, and this negative purging pressure also acts on the negative pressure open/close valve. The tank internal pressure acts on the negative pressure open/close valve from the fuel tank side. The negative pressure open/close valve closes at the pressure difference between the negative purging pressure and the tank internal pressure. Accordingly, the canister can be efficiently purged since the negative purging pressure does not act on the fuel tank.

In contrast, when, for example, detecting perforations in the fuel tank system, negative pressure (negative pump pressure) acts on the canister from the negative pressure pump, and the negative pump pressure also acts on the negative pressure open/close valve. Tank internal pressure acts on the negative pressure open/close valve from the fuel tank side. The negative pressure open/close valve is maintained in the open state at the pressure difference between the negative pump pressure and the tank internal pressure. The negative pump pressure accordingly acts on the fuel tank, thereby enabling perforations to be detected in a section spanning from the negative pressure pump, through the canister and the vent pipe, up to the fuel tank A second aspect is the first aspect, further including a bypass pipe that bypasses the negative pressure open/close valve in the vent pipe, and a bypass open/close valve that opens and closes the bypass pipe.

Accordingly, in cases in which a large amount of vaporized fuel is generated in the fuel tank, for example, when fueling the fuel tank, a large amount of gas can move from the fuel tank to the canister in a short time if the bypass pipe is opened by the bypass open/close valve.

A third aspect is the second aspect, wherein the bypass open/close valve is divided into a tank side main chamber that is in communication with the bypass pipe at a fuel tank side and a back pressure chamber that is disposed on an opposite side of a valve member main body from a tank side main chamber side, and is a diaphragm valve that opens when the valve member main body moves due to pressure acting on the valve member main body from the tank side main chamber.

The diaphragm valve is accordingly opened when the tank internal pressure acts on the valve member main body thereby moving the valve member main body. Namely, the bypass open/close valve can be configured by the mechanical structure of the diaphragm valve.

A fourth aspect is any one of the first aspect to the third aspect, further including a tank internal pressure sensor that detects the tank internal pressure of the fuel tank, and a control device that controls driving of the negative pressure pump, and that uses changes in the tank internal pressure detected by the tank internal pressure sensor to detect perforations in a section spanning from the negative pressure pump, through the canister and the vent pipe, up to the fuel tank.

Although the negative pump pressure acts on the negative pressure open/close valve when the negative pressure pump is driven by the controller, the negative pump pressure acts on the fuel tank through the canister and the vent pipe since the negative pressure open/close valve is maintained in the open state at the pressure difference between the negative pump pressure and the tank internal pressure. The control device can therefore use changes in the tank internal pressure detected by the tank internal pressure sensor to detect perforations in the section spanning from the negative pressure pump, through the canister and the vent pipe, up to the fuel tank.

Due to having the above configuration, the present invention enables perforations to be detected in the fuel tank system, and enables the canister to be efficiently purged.

BRIEF DESCRIPTION OF THE DRAWINGS

Exemplary embodiments of the present invention will be described in detail based on the following figures, wherein.

DETAILED DESCRIPTION

Figure 1:
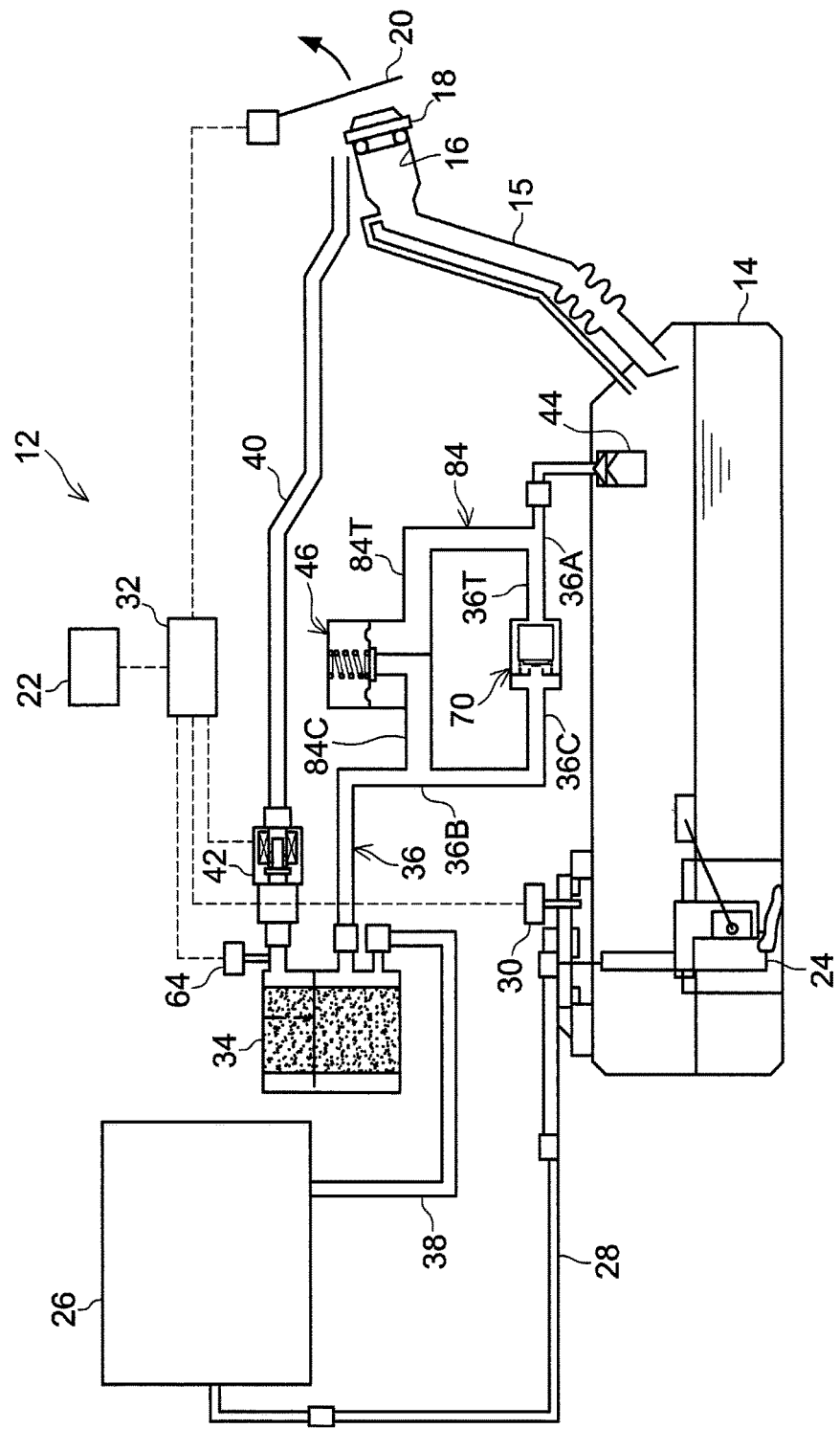
FIG. 1 is a configuration diagram illustrating a fuel tank system of a first exemplary embodiment.

FIG. 1 illustrates a fuel tank system 12 of a first exemplary embodiment.

The fuel tank system 12 includes a fuel tank 14 capable of internally housing fuel. A lower portion of an inlet pipe 15 is connected to an upper portion of the fuel tank 14. An opening portion in an upper end of the inlet pipe 15 is a fueling port 16. The fuel tank 14 can be fueled by inserting a fuel gun into the fueling port 16. The fueling port 16 of the inlet pipe 15 is normally sealed by a fuel cap 18. When fueling the fuel tank 14, the fuel cap 18 is removed by a fueling operator or the like.

A fuel lid 20 is provided to a vehicle body panel at the outer side of the fuel cap 18. When information indicating that a lid release switch 22, provided, for example, inside a vehicle cabin, has been operated is sent to a control device 32, the fuel lid 20 is opened by the control device 32 under specific conditions.

A fuel pump 24 is provided inside the fuel tank 14. The fuel pump 24 is connected to an engine 26 by a fuel supply pipe 28. Fuel inside the fuel tank 14 can be dispatched to the engine 26 through the fuel supply pipe 28 by driving the fuel pump 24.

A tank internal pressure sensor 30 is provided to the fuel tank 14. Information indicating the tank internal pressure in the fuel tank 14 detected by the tank internal pressure sensor 30 is sent to the control device 32. During perforation detection, described below, the control device 32 determines whether or not there is a perforation in the fuel tank 14 or the like based on changes in the tank internal pressure.

A canister 34 is provided outside the fuel tank 14. An adsorbent such as activated carbon is stored inside the canister 34. A gaseous layer inside the fuel tank 14 is connected to the canister 34 by a vent pipe 36, and gas inside the fuel tank 14 can flow into the canister 34. Vaporized fuel in the gas flowing into the canister 34 is adsorbed by the adsorbent of the canister 34, and other gasses (atmospheric components) are exhausted into the atmosphere through an atmosphere-communication pipe 40.

A purge pipe 38 that is in communication with the engine 26 is connected to the canister 34. Negative pressure generated during operation of the engine 26 can be caused to act on the canister 34 through the purge pipe 38, causing vaporized fuel adsorbed on the adsorbent inside the canister 34 to desorb. The desorbed vaporized fuel (vapor) is dispatched to the engine 26 and combusted. At this time, atmosphere is introduced into the canister 34 through the atmosphere-communication pipe 40.

A negative pressure pump 42 is provided at the atmosphere-communication pipe 40. The negative pressure pump 42 is driven under control by the control device 32. The negative pressure pump 42 is employed when detecting perforations in the fuel tank system 12 by causing a specific negative pressure to act on the fuel tank 14 through the vent pipe 36 from the canister 34.

A full tank restriction valve 44 is provided to an end portion at the fuel tank 14 side of the vent pipe 36 so as to be positioned at an upper portion inside the fuel tank 14.

A negative pressure open/close valve 70 is provided at an intermediate portion of the vent pipe 36. Hereafter, the vent pipe 36 further to the fuel tank 14 side than the negative pressure open/close valve 70 is referred to as a tank side vent pipe 36T, and the vent pipe 36 further to the canister 34 side than the negative pressure open/close valve 70 is referred to as a canister side vent pipe 36C where appropriate.

Figure 2:
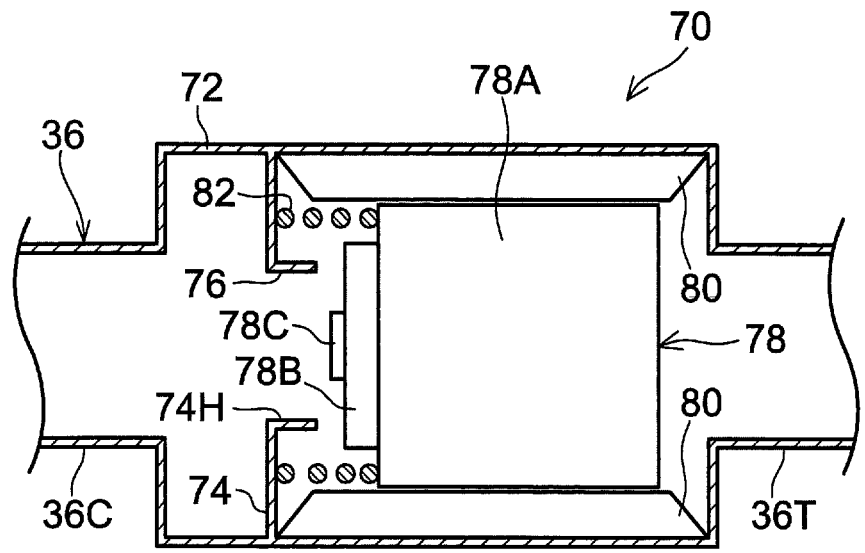
FIG. 2 is a cross-section illustrating a negative pressure open/close valve of a fuel tank system of the first exemplary embodiment in an open valve state.
Figure 3:
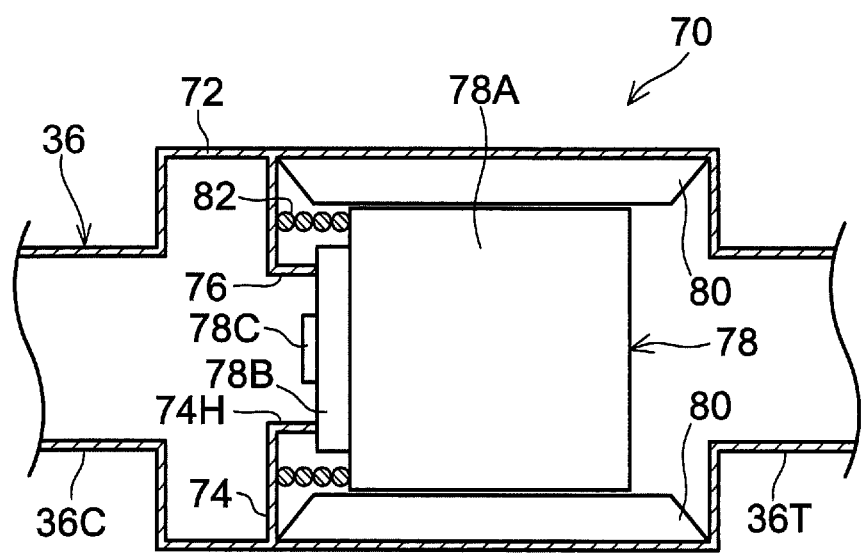
FIG. 3 is a cross-section illustrating a negative pressure open/close valve of a fuel tank system of the first exemplary embodiment in a closed valve state.

As illustrated in detail in FIG. 2 and FIG. 3, the negative pressure open/close valve 70 includes a valve housing 72 that locally widens the diameter of the vent pipe 36. A valve seat 74, formed with a communication port 74H in the center thereof, is fixed inside the valve housing 72. A flattened tube shaped reinforcement piece 76 juts out from the periphery of the communication port 74H.

A valve body 78 is disposed further to the tank side vent pipe 36T side than the valve seat 74. The valve body 78 can move between an open position in which the communication port 74H is separating from the valve seat 74 and is opened (see FIG. 2), and a closed position in which the communication port 74H contacts the valve seat 74 and is closed (see FIG. 3). Gas can move through the vent pipe 36 when the valve body 78 is in the open position. Conversely, gas is prevented from moving through the vent pipe 36 when the valve body 78 is in the closed position.

In the examples illustrated in FIG. 2 and FIG. 3, plural guiding ribs 80 running along the movement direction of the valve body 78 are formed to the inner peripheral face of the valve housing 72 around the peripheral direction of the valve housing 72. A valve main body 78A of the valve body 78 is guided by the guiding ribs 80, and therefore moves between the open position and the closed position in a stable manner.

Sealing rubber 78B is attached to a face of the valve main body 78A opposing the valve seat 74 by a fastener 78C. When the valve body 78 is in the closed position, the sealing rubber 78B makes close contact with a leading end of the reinforcement piece 76, thereby closing the communication port 74H.

When the engine 26 is driven, negative pressure generated by driving the engine 26 acts on the valve body 78 from the canister side vent pipe 36C side through the canister 34. Hereafter, the negative pressure acting on the valve body 78 at this time is referred to as negative purging pressure. When the negative pressure pump 42 is driven, negative pressure generated by driving the negative pressure pump 42 acts on the valve body 78 from the canister side vent pipe 36C side through the canister 34. Hereafter, the negative pressure acting on the valve body 78 at this time is referred to as negative pump pressure. The tank internal pressure of the fuel tank 14 also acts on the valve body 78 from the tank side vent pipe 36T side.

A valve biasing spring 82 is disposed between the valve seat 74 and the valve body 78. The valve biasing spring 82 acts on the valve body 78 with elastic force (biasing force) toward the open position of the valve body 78. The biasing force of the valve biasing spring 82 maintains the open position of the valve body 78 (see FIG. 2) at the pressure difference between the negative pump pressure acting on the negative pressure open/close valve 70 and the tank internal pressure, and is set with a specific size such that the valve body 78 is moved to the closed position (see FIG. 3) at the pressure difference between the negative purging pressure and the tank internal pressure.

As illustrated in FIG. 1, the vent pipe 36 is branched partway along by branching portions 36A, 36B, and a bypass pipe 84 is formed between the branching portions 36A, 36B. The bypass pipe 84 bypasses the negative pressure open/close valve 70. Hereafter, the bypass pipe 84 further to the fuel tank 14 side than a diaphragm valve 46 is referred to as a tank side bypass pipe 84T, and the bypass pipe 84 further to the canister 34 side than the diaphragm valve 46 is referred to as a canister side bypass pipe 84C, where appropriate.

Figure 4:
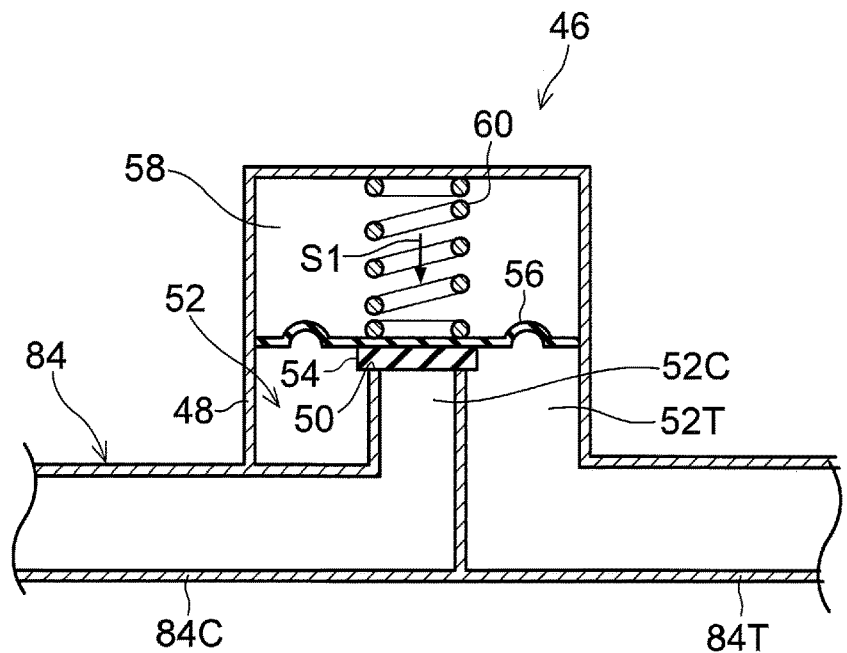
FIG. 4 is a cross-section illustrating a diaphragm valve of a fuel tank system of the first exemplary embodiment in a closed valve state.
Figure 5:
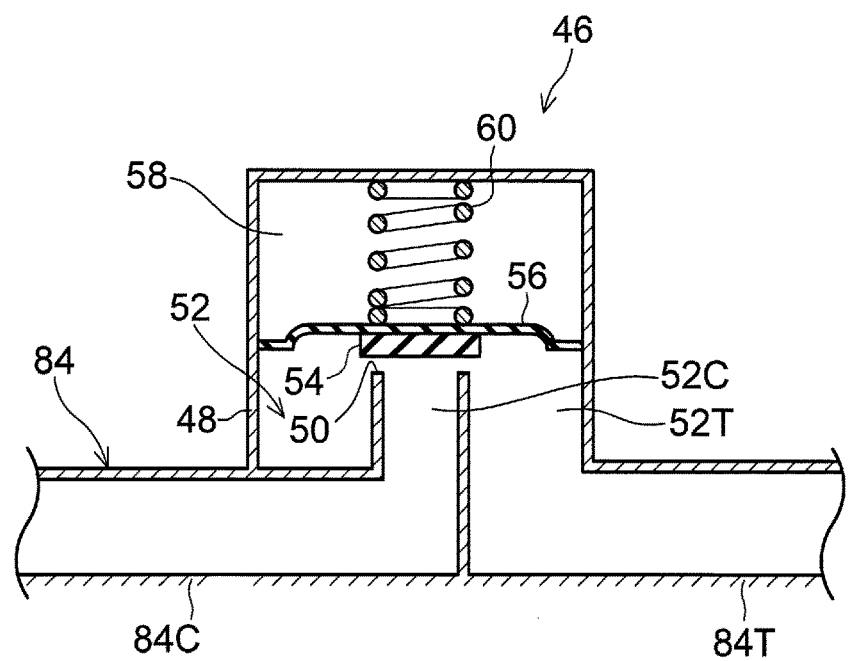
FIG. 5 is a cross-section illustrating a diaphragm valve of a fuel tank system of the first exemplary embodiment in an open valve state.

As illustrated in FIG. 4 and FIG. 5, the diaphragm valve 46 includes a circular tube shaped valve housing 48 connected to the tank side bypass pipe 84T. One end side of the canister side bypass pipe 84C is housed inside the valve housing 48. The one end side of the canister side bypass pipe 84C bends so as to be coaxial to the valve housing 48, and this end portion is a valve seat 50.

The opening portion of the valve seat 50 can be sealed by a valve member main body 54. The valve member main body 54 is attached to a diaphragm 56. Moreover, the interior of the valve housing 48 is upper-lower divided by the diaphragm 56. An upper side space inside the valve housing 48, above the diaphragm 56 in FIG. 4, is a back pressure chamber 58. A lower side space below the diaphragm 56 in FIG. 4 is a main chamber 52. A portion of the main chamber 52 corresponding to the one end side of the canister side bypass pipe 84C is a canister side main chamber 52C, and the other portion of the main chamber 52 is a tank side main chamber 52T.

A compressed coil spring 60 is housed inside the back pressure chamber 58. The compressed coil spring 60 causes an elastic force to act on the valve member main body 54 in a direction of movement of the valve member main body 54 toward the valve seat 50 (the direction of an arrow S1). The diaphragm 56 also causes an elastic force to act on the valve member main body 54 in the arrow S1 direction. This biases the valve member main body 54 in a direction that seals the opening portion of the valve seat 50. For example, the valve member main body 54 makes close contact with the valve seat 50 when the internal pressures in the canister side main chamber 52C and the tank side main chamber 52T are approximately equal to the internal pressure in the back pressure chamber 58. The opening portion of the valve seat 50 is thereby sealed, preventing gas from moving (flowing) between the tank side main chamber 52T and the canister side main chamber 52C. Namely, the diaphragm valve 46 adopts a closed valve state, and gas is prevented from moving through the bypass pipe 84.

In contrast, for example, when the internal pressures of the back pressure chamber 58 and the canister side main chamber 52C become a negative pressure with respect to the internal pressure of the tank side main chamber 52T of a specific value or greater (a state of low internal pressure), the valve member main body 54 moves to the back pressure chamber 58 side against resistance from the elastic force of the compressed coil spring 60 and the diaphragm 56, and the opening portion of the valve seat 50 opens. This enables gas to move (flow) between the tank side main chamber 52T and the canister side main chamber 52C. Namely, the diaphragm valve 46 adopts an open state, enabling gas to move through the bypass pipe 84.

As illustrated in FIG. 1, a canister internal pressure sensor 64 is provided to a portion of the atmosphere-communication pipe 40 between the negative pressure pump 42 and the canister 34. The canister internal pressure sensor 64 detects the pressure at this portion (effectively the canister internal pressure), and sends the information to the control device 32. The control device 32 determines whether or not there is a perforation in the fuel tank 14 based on changes in the canister internal pressure or the tank internal pressure after the negative pressure pump 42 has operated.

Explanation next follows regarding operation of the fuel tank system 12 of the present exemplary embodiment.

As explained below, the fuel tank system 12 of the present exemplary embodiment is capable of detecting perforations in the fuel tank 14.

The negative pump pressure of the negative pressure pump 42 acts on the valve body 78 of the negative pressure open/close valve 70 when the control device 32 causes the negative pressure pump 42 to operate. As illustrated in FIG. 2, the valve body 78 is maintained in an open position at the pressure difference between the negative pump pressure acting on the negative pressure open/close valve 70 and the tank internal pressure of the fuel tank 14. The negative pump pressure thereby acts on the fuel tank 14 through the canister 34 and the canister side vent pipe 36C.

Figure 6:
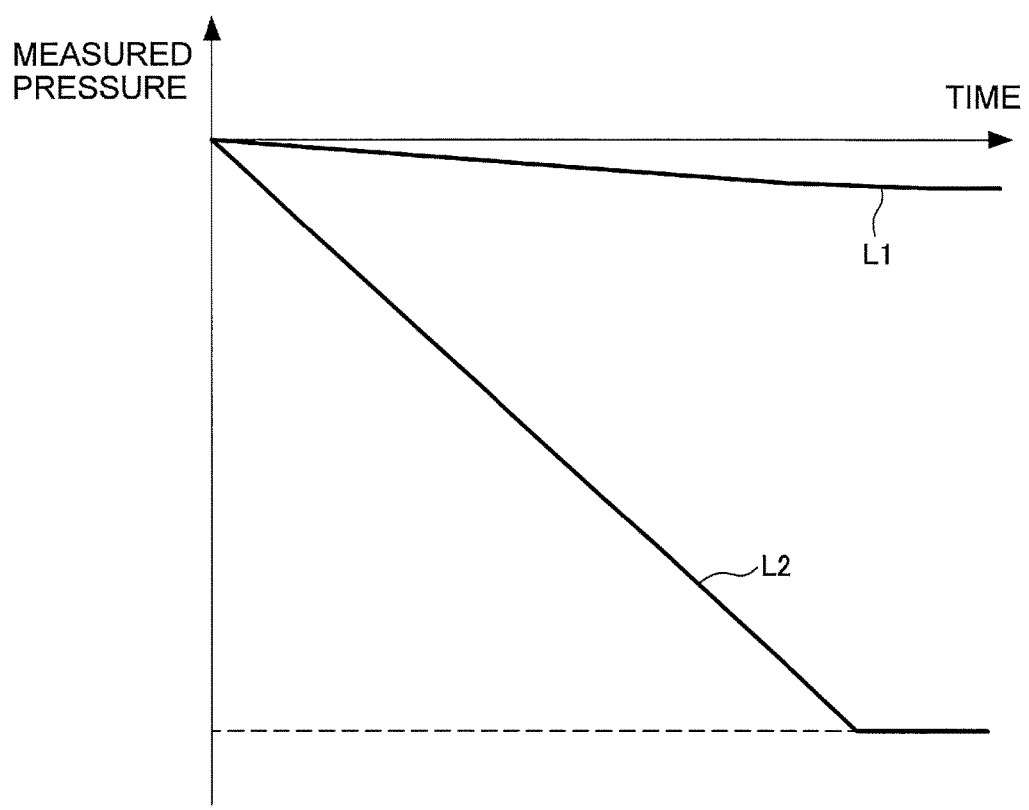
FIG. 6 is a graph illustrating change over time in pressure measurements when detecting perforations in a fuel tank system of the first exemplary embodiment.

In a state in which the negative pump pressure acts on the fuel tank 14, when there are no perforations in the fuel tank 14, the tank internal pressure in the fuel tank 14 measured by the tank internal pressure sensor 30 (referred to as the measured pressure hereafter) decreases with time until reaching (decreasing to) a specific pressure as indicated by the solid line L2 in FIG. 6. In contrast, when there is a perforation in the fuel tank 14, the measured pressure resembles the solid line L1 in FIG. 6. Namely, even when negative pressure acts on the fuel tank 14, gas is introduced into the fuel tank 14 through the perforation in the fuel tank 14 and the tank internal pressure does not reach (decrease to) the specific pressure.

It can accordingly be determined that there is no perforation in the fuel tank 14 when the relationship between the measured pressure and time is a relationship resembling the solid line L2 in FIG. 6. Alternatively, it can be determined that there is a perforation in the fuel tank 14 when the relationship between the measured pressure and time is a relationship resembling the solid line L1 in FIG. 6.

In the fuel tank system 12 of the present exemplary embodiment, an ordinary control method can be applied as the control method employed in the perforation detection to determine whether or not there is a perforation, since the internal pump pressure reliably acts on the fuel tank 14 in this manner.

Moreover, in the fuel tank system 12 of the present exemplary embodiment, negative pressure when driving the engine 26 can be made to act on the canister 34 to cause vaporized fuel to desorb from the adsorbent of the canister 34.

In contrast, when the engine 26 is driven, the negative pressure of the engine 26 acts as a negative purging pressure on the valve body 78 of the negative pressure open/close valve 70. As illustrated in FIG. 3, the valve body 78 moves to the closed position against resistance from the biasing force of the valve biasing spring 82, due to the pressure difference between the negative purging pressure acting on the negative pressure open/close valve 70 and the tank internal pressure. In this state, the negative purging pressure does not act on the fuel tank 14 through the vent pipe 36, since the vent pipe 36 is closed. This enables the negative pressure of the engine 26 to be caused to effectively act as a negative purging pressure on the canister 34, and the canister 34 to be efficiently purged.

As described above, the negative pressure open/close valve 70 is a valve that switches between open and closed states due to the valve body 78 being acted on by the pressure difference between the pressure acting on the canister side vent pipe 36C and the pressure acting on the tank side vent pipe 36T. In practice, this can be described as a valve that switches between the open and closed states according to the flow rate (quantity of flow per unit of time) of gas that attempts to flow through the negative pressure open/close valve 70.

For example, it can be envisaged that the passing flow rate S when the gas passes through the negative pressure open/close valve 70 due to driving the negative pressure pump 42 has a maximum of approximately 10 L/min, and the passing flow rate S due to driving the engine 26 exceeds 10 L/min. In such cases, the negative pressure open/close valve 70 is set to have valve opening characteristics of, for example, maintaining the open state when S<10 L/min, and closing when S≥10 L/min. Moreover, 10 L/min corresponds to 1 kPa (kilopascal) when converted to negative pressure. The negative pressure open/close valve 70 is accordingly set so as to have a valve opening characteristic of, for example, maintaining the open state when S<1 kPa, and closing when S≥1 kPa.

Note that a structure is conceivable in which an orifice is formed in the vent pipe 36 instead of the negative pressure open/close valve 70, in order to make the negative pump pressure act on the fuel tank 14 reliably during perforation detection while suppressing the negative purging pressure from acting on the fuel tank 14 during purging. However, the negative purging pressure acts on the fuel tank 14 through the orifice even when the orifice is formed in the vent pipe 36. When the flow path cross-sectional area of the orifice is made overly small in order to minimize the negative purging pressure applied to the fuel tank 14, the negative pump pressure becomes unable to effectively act on the fuel tank 14 when the negative pressure pump 42 is driven. In the present exemplary embodiment, the negative pressure open/close valve 70 does not incur the above deficiencies since the negative pressure open/close valve 70 switches between the open and closed states between purging and perforation diagnosis (perforation detection).

In the fuel tank system 12 of the present exemplary embodiment, gas that includes vaporized fuel generated in the fuel tank 14 when fueling the fuel tank 14 can be sent to the canister 34. Although the tank internal pressure (positive pressure) acts on the valve body 78 of the negative pressure open/close valve 70 at this time, the valve opening pressure of the negative pressure open/close valve 70 is set such that the valve body 78 does not move to the closed position at this tank internal pressure.

The valve opening pressure of the negative pressure open/close valve 70 is set for the relationship between the tank internal pressure (positive pressure) and the negative purge pressure and the negative pump pressure, in consideration of the tank internal pressure in the ordinary state (an internal pressure lower than the tank internal pressure when fueling the fuel tank 14).

In the present exemplary embodiment, the bypass pipe 84 and the diaphragm valve 46 might be said to be unnecessary for making configuration such that the negative purging pressure is not caused to act on the fuel tank 14, and for causing the negative pump pressure to act on the fuel tank 14. However, in consideration of fueling the fuel tank 14, it is preferable that the bypass pipe 84 is provided and that the bypass pipe 84 can be opened and closed using a valve (the bypass open/close valve) for the following reasons.

When fueling the fuel tank 14, the tank internal pressure acts on the tank side main chamber 52T of the diaphragm valve 46, thereby also opening the diaphragm valve 46. The gas inside the fuel tank 14 accordingly flows to the canister 34 through the bypass pipe 84 also, and a large quantity of flow of gas to the canister 34 from the fuel tank 14 can be ensured.

In contrast, closing the diaphragm valve 46 when the fuel tank 14 is not being fueled makes it difficult for gas to move from the fuel tank 14 to the canister 34, such that only a small amount of adsorption of vaporized fuel by the adsorbent of the canister 34 suffices, and the load on the canister 34 is reduced. From related viewpoints, the valve that opens and closes the bypass pipe 84 (the bypass open/close valve) is not limited to the diaphragm valve 46, and may be, for example, a solenoid valve.

In particular, in the present exemplary embodiment, as described above, configuration is made such that the negative pressure open/close valve 70 is not closed even when the tank internal pressure (positive pressure) when fueling the fuel tank 14 acts on the negative pressure open/close valve 70. However, a flow path for gas from the fuel tank 14 to the canister 34 is ensured by the bypass pipe 84 even when a state is generated in which the negative pressure open/close valve 70 is temporarily closed due to fluctuations in the tank internal pressure during fueling.

Moreover, in the fuel tank system 12 of the present exemplary embodiment, the negative pressure open/close valve 70 is open when the vehicle is stationary. The tank internal pressure is thereby maintained at a pressure close to atmospheric pressure, since a state is given in which the interior of the fuel tank 14 is in communication with the atmosphere through the vent pipe 36, the canister 34, and the atmosphere-communication pipe 40.

The tank internal pressure of the fuel tank 14 is thereby sometimes raised or lowered to a value close to atmospheric pressure when the vehicle is stationary. When the tank internal pressure inside the fuel tank 14 is raised, some of the gas inside the fuel tank 14 flows to the canister 34 through the vent pipe 36. This enables vaporized fuel inside the fuel tank 14 to be suppressed from being exhausted to the atmosphere even when the vehicle is stationary.

In contrast, in cases in which the tank internal pressure is lowered while the vehicle is stationary, the tank internal pressure (negative pressure) acts on the canister 34 through the vent pipe 36. In such cases, desorption of vaporized fuel from the adsorbent of the canister 34 (known as "back purging") is possible due to the tank internal pressure.

What is claimed is:

1. A fuel tank system, comprising:
a fuel tank that internally stores fuel;
a canister in which vaporized fuel generated in the fuel tank is adsorbed and desorbed by an adsorbent, and that is open to the atmosphere by an atmosphere communication pipe;
a purging pipe that places an engine in communication with the canister;
a vent pipe that places the fuel tank in communication with the canister;
a negative pressure pump that is provided at the atmosphere communication pipe, and that causes negative pressure to act on the fuel tank from the canister;
a negative pressure open/close valve that is provided at the vent pipe, that maintains an open state at a pressure difference between a negative pump pressure acting from the negative pressure pump and a tank internal pressure acting from the fuel tank, and that closes at a pressure difference between a negative purging pressure acting from the engine and the tank internal pressure acting from the fuel tank, the negative pressure open/close valve switching between the open state and the closed state by virtue of a valve body of the negative pressure open/close valve being acted on by a pressure difference between pressure acting on a canister side of the vent pipe and pressure acting on a fuel tank side of the vent pipe;
a tank internal pressure sensor that detects the tank internal pressure of the fuel tank; and
a control device that controls driving of the negative pressure pump, and that uses changes in the tank internal pressure detected by the tank internal pressure sensor to detect perforations in a section spanning from the negative pressure pump, through the canister and the vent pipe, up to the fuel tank,
wherein the negative pressure open/close valve comprises:
the valve body, the valve body moving between a closed position preventing movement of gas in the vent pipe and an open position enabling movement of gas in the vent pipe; and
a valve body biasing spring causing a biasing force in a direction of movement of the valve body toward the open position to act on the valve body,
wherein the biasing force of the valve body biasing spring is set so as to maintain the valve body in the open position at the pressure difference between the negative purging pressure acting on the valve body from the negative pressure pump and the tank internal pressure acting on the valve body from the fuel tank, and to move the valve body to the closed position at the pressure difference between the negative purging pressure acting on the valve body from the engine and the tank internal pressure acting on the valve body from the fuel tank.

2. The fuel tank system of claim 1, further comprising:
a bypass pipe that bypasses the negative pressure open/close valve in the vent pipe; and
a bypass open/close valve that opens and closes the bypass pipe.

3. The fuel tank system of claim 2, wherein:
the bypass open/close valve is divided into a tank side main chamber that is in communication with the bypass pipe at a fuel tank side and a back pressure chamber that is disposed on an opposite side of a valve member main body from a tank side main chamber side, and is a diaphragm valve that opens when the valve member main body moves due to pressure acting on the valve member main body from the tank side main chamber.

4. The fuel tank system of claim 1, wherein the negative pressure open/close valve is disposed between the canister and a fueling port of the fuel tank.

* * * * *